(12) United States Patent
Fukuda et al.

(10) Patent No.: US 7,281,722 B2
(45) Date of Patent: Oct. 16, 2007

(54) WHEELED VEHICLE WITH SUSPENSION UNITS

(75) Inventors: Hiromi Fukuda, Iwata (JP); Noboru Kamiya, Iwata (JP); Hitoshi Yoneyama, Iwata (JP)

(73) Assignee: Yamaha Motor Co., Ltd., Shizuoka (JP)

( * ) Notice: Subject to any disclaimer, the term of this patent is extended or adjusted under 35 U.S.C. 154(b) by 239 days.

(21) Appl. No.: 11/064,402

(22) Filed: Feb. 23, 2005

(65) Prior Publication Data
US 2005/0194197 A1 Sep. 8, 2005

(30) Foreign Application Priority Data
Feb. 23, 2004 (JP) ............................. 2004-047038

(51) Int. Cl.
*B62K 25/04* (2006.01)
(52) U.S. Cl. ............................. 280/124.104; 280/283; 180/227
(58) Field of Classification Search ................ 180/219, 180/227; 280/5.513, 283, 284, 124.104
See application file for complete search history.

(56) References Cited

U.S. PATENT DOCUMENTS

| | | | | |
|---|---|---|---|---|
| 5,486,018 A | * | 1/1996 | Sakai | ..................... 280/124.16 |
| 6,250,658 B1 | * | 6/2001 | Sakai | ................... 280/124.106 |
| 6,942,230 B1 | * | 9/2005 | Fontdecaba Buj | ... 280/124.104 |
| 7,168,720 B2 | * | 1/2007 | Fontdecaba Buj | ... 280/124.159 |

FOREIGN PATENT DOCUMENTS

| | | | |
|---|---|---|---|
| EP | 1213218 A2 | * | 6/2002 |
| JP | 2002-173074 | | 6/2002 |
| WO | WO 03/022605 A2 | * | 3/2003 |

* cited by examiner

*Primary Examiner*—Kevin Hurley
(74) *Attorney, Agent, or Firm*—Knobbe Martens Olson & Bear LLP

(57) ABSTRACT

A wheeled vehicle has a front suspension unit coupled with a body frame to suspend a front wheel. The front suspension unit allows the front wheel to move relative to the body frame. The front suspension unit has a pair of front suspension members coupled with each other. A rear suspension unit is coupled with the body frame to suspend a rear wheel. The rear suspension unit allows the rear wheel to move relative to the body frame. A hydraulic system inhibits a position of the body frame from changing relative to the ground. The hydraulic system has a first hydraulic device to generate hydraulic pressure in response to the movement of the front wheel relative to the body frame. A second hydraulic device generates hydraulic pressure in response to the movement of the rear wheel relative to the body frame. A hydraulic pressure adjusting device connects the first and second hydraulic devices with each other. The hydraulic pressure adjusting device adjusts the hydraulic pressure of the second hydraulic device in response to the hydraulic pressure of the first hydraulic device and vice versa. The first hydraulic device is built in one of the front suspension members.

20 Claims, 7 Drawing Sheets

WHEELED VEHICLE WITH SUSPENSION UNITS

PRIORITY INFORMATION

This application is based on and claims priority to Japanese Patent Application No. 2004-047038, filed Feb. 23, 2004, the entire contents of which is hereby incorporated by reference.

BACKGROUND OF THE INVENTIONS

1. Field of the Inventions

The present inventions generally relate to wheeled vehicles, and more particularly to wheeled vehicles having suspension units that suspend wheels of the vehicle.

2. Description of the Related Art

Wheeled vehicles such as, for example, motorcycles have a plurality of wheels and a plurality of suspension units that are coupled with a body frame to suspend the wheels therefrom. Typically, motorcycles have front and rear wheels suspended by front and rear suspension units, respectively. Motorcycles also include an engine that powers one of the wheel; usually the rear wheel.

The front suspension unit typically includes a front fork that has a pair of fork members. The fork members interpose the front wheel therebetween and journal an axle of the front wheel. The rear suspension unit can include a rear arm that pivotally carries the rear wheel and a rear strut that suspends the rear arm.

Generally, the front fork has a structure that allows the front wheel to move up and down relative to the body frame, while the damper has a similar structure that allows the rear wheel to move up and down relative to the body frame. With such suspension system, motorcycles tend to squat when the rider abruptly starts or accelerates the motorcycle. In other words, the front forks are likely to extend, possibly up to the point where the front wheel leaves the ground while the rear suspension compresses. On the other hand, such motorcycles tend to dive when the rider abruptly stops or decelerates the motorcycle. In other words, the front forks compress while the rear suspension extends, possibly to the point where the rear wheel leaves the ground. Thus, the motorcycles can change their position, in a manner that can be uncomfortable to a rider during sudden acceleration or sudden deceleration.

SUMMARY OF THE INVENTIONS

In order to inhibit the vehicle from changing its position against the rider's will, the vehicle can have a hydraulic system. The hydraulic system can include a front hydraulic device that generates hydraulic pressure in response to the movement of the front wheel and a rear hydraulic device that generates hydraulic pressure in response to the movement of the rear wheel. A hydraulic pressure adjusting device can connect the front and rear hydraulic devices with each other such that the hydraulic pressure adjusting device adjusts the hydraulic pressure of the rear hydraulic device in response to the hydraulic pressure in the front hydraulic device and vice versa.

In accordance with one embodiment is the recognition of the need for an improved vehicle, such as a motorcycle, that can provide a hydraulic system for suspension units that does not make the layout of other components around a front fork difficult.

To address one or more of such needs, one embodiment involves a wheeled vehicle comprising a body frame and front and rear wheels. A front suspension unit is coupled with the body frame to suspend the front wheel. The front suspension unit allows the front wheel to move relative to the body frame. The front suspension unit has a pair of front suspension members coupled with each other. A rear suspension unit is coupled with the body frame to suspend the rear wheel. The rear suspension unit allows the rear wheel to move relative to the body frame. A hydraulic system is arranged to inhibit a position of the body frame from changing relative to the ground. The hydraulic system comprises a first hydraulic device configured to generate hydraulic pressure in response to the movement of the front wheel relative to the body frame. A second hydraulic device is configured to generate hydraulic pressure in response to the movement of the rear wheel relative to the body frame. A hydraulic pressure adjusting device is arranged to connect the first and second hydraulic devices with each other. The hydraulic pressure adjusting device adjusts the hydraulic pressure of the second hydraulic device in response to the hydraulic pressure of the first hydraulic device and vice versa. The first hydraulic device is built in one of the front suspension members.

In accordance with another embodiment, a wheeled vehicle comprises a body frame and first and second wheels. A first suspension unit is coupled with the body frame to suspend the first wheel. The first suspension unit allows the first wheel to move relative to the body frame. The first suspension unit has a pair of first suspension members coupled with each other. Each one of the first suspension members has a first section and a second section. The first or second section carries the first wheel. The first and second sections are coupled with each other to axially move relative to one another. A second suspension unit is coupled with the body frame to suspend the second wheel. The second suspension unit allows the second wheel to move relative to the body frame. The second suspension unit has a third suspension member arranged to pivotally carry the second wheel. A fourth suspension member is arranged to suspend the third suspension member. A hydraulic system is arranged to inhibit a position of the body frame from changing relative to the ground. The hydraulic system comprises a first hydraulic device configured to generate hydraulic pressure in response to the movement of the first wheel relative to the body frame. A second hydraulic device is configured to generate hydraulic pressure in response to the movement of the second wheel relative to the body frame. A hydraulic pressure adjusting device is arranged to connect the first and second hydraulic devices with each other. The hydraulic pressure adjusting device adjusts the hydraulic pressure of the second hydraulic device in response to the hydraulic pressure of the first hydraulic device and vice versa. The first hydraulic device is built in one of the front suspension members. The second hydraulic device is built in the fourth suspension member.

In accordance with a further embodiment, a motorcycle comprises front and rear wheels. A front hydraulic device is configured to generate hydraulic pressure in response to up and down movement of the front wheel. A rear hydraulic device is configured to generate hydraulic pressure in response to up and down movement of the front wheel. A hydraulic pressure adjusting device is arranged to connect the front and rear hydraulic devices with each other. The hydraulic pressure adjusting device adjusts the hydraulic pressure of the rear hydraulic device in response to the hydraulic pressure of the front hydraulic device. A front fork is arranged to support the front wheel. The front fork has a pair of fork members connected by a fork bracket. The front hydraulic device is built in one of the fork members.

BRIEF DESCRIPTION OF THE DRAWINGS

These and other features, aspects and advantages of the present inventions are now described with reference to the drawings of preferred embodiments, which are intended to illustrate and not to limit the present inventions. The drawings comprise seven figures in which.

DETAILED DESCRIPTION OF THE PREFERRED EMBODIMENT

Figure 1:
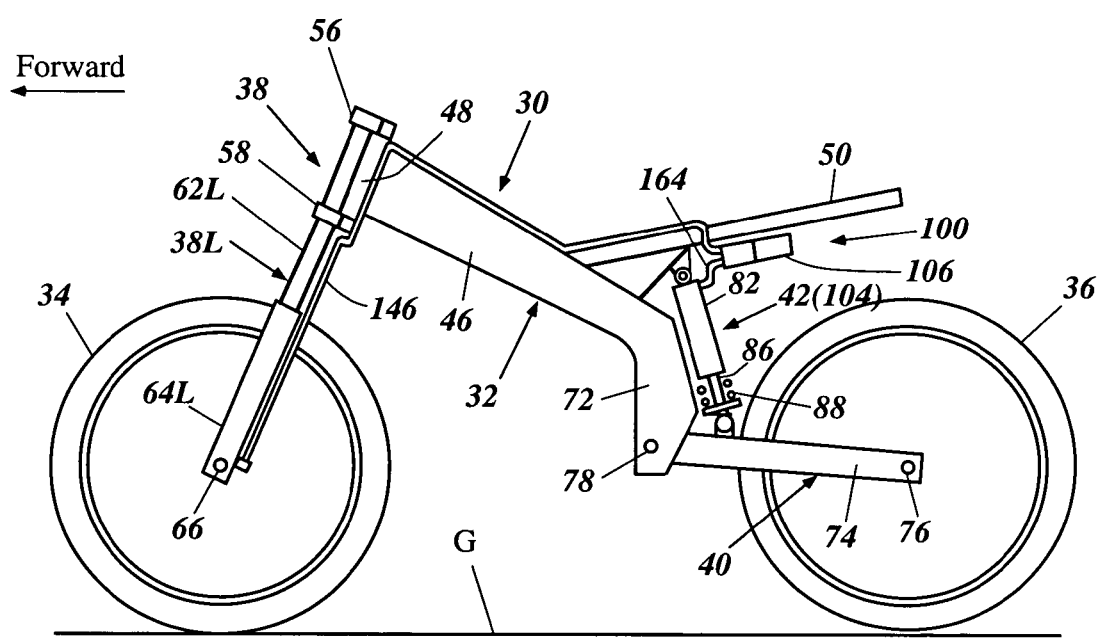
FIG. 1 is a schematic side elevational view of a suspension system configured in accordance with an embodiment and installed on a motorcycle, wherein some components of the motorcycle such as a seat, handle bar, engine, and other components are omitted.
Figure 2:
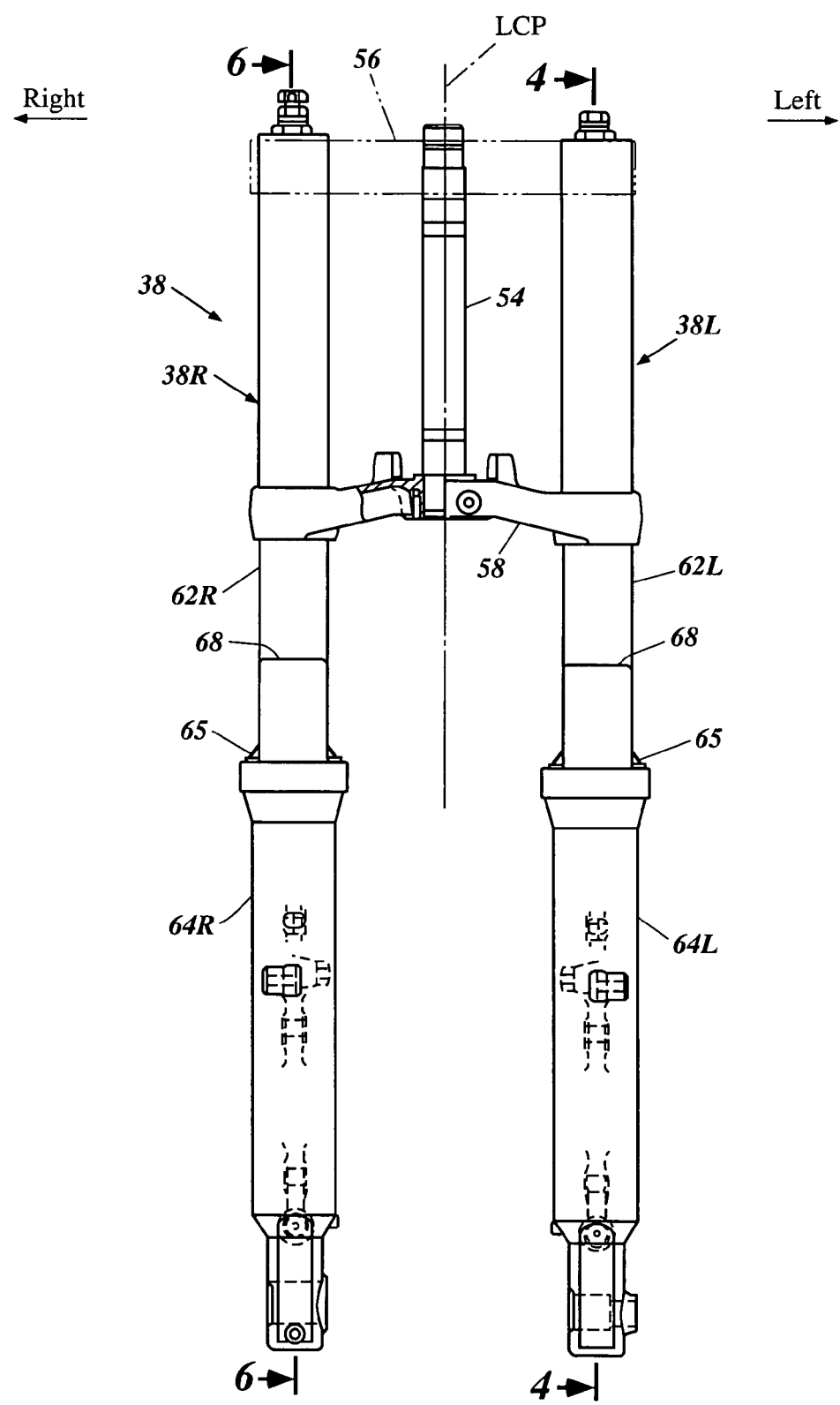
FIG. 2 is a front elevational view of a front fork (i.e., front suspension unit) of the motorcycle.
Figure 3:
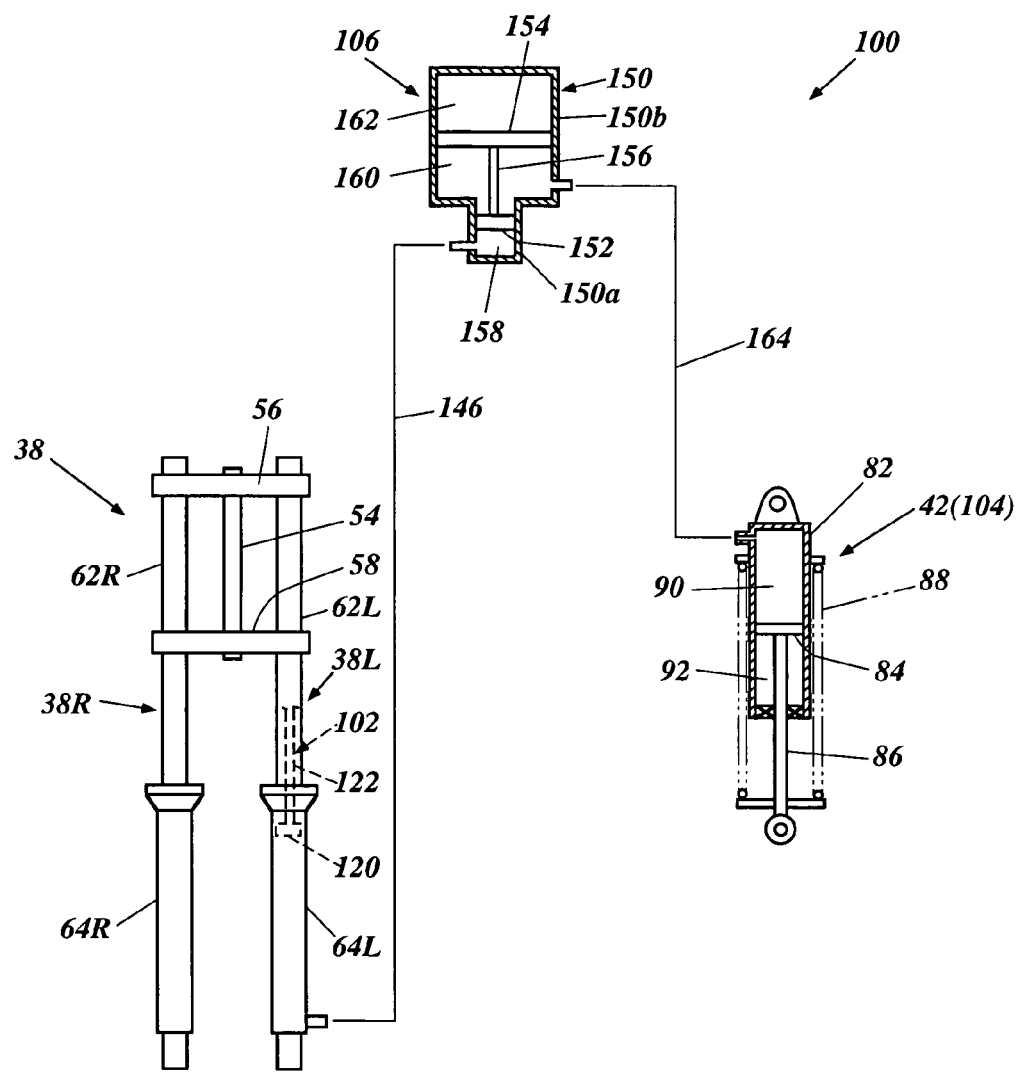
FIG. 3 is a schematic diagram of the suspension system of the motorcycle, wherein a hydraulic pressure adjusting device and a rear damper are shown in cross-section.

With reference to FIGS. 1-3, a motorcycle 30 configured in accordance with an embodiment is described. The motorcycle 30 merely exemplifies one type of a wheeled vehicle with which the present inventions can be used. The suspension units are described below in the environment of use of a motorcycle 30 because they have particular utility in this context. However, the suspension units can be applied to other types of wheeled vehicles such as, for example, motor scooters, mopeds, and other vehicles. Such applications will be apparent to those of ordinary skill in the art in light of the description herein.

With reference to FIG. 1, the motorcycle 30 comprises a body frame 32, a front wheel 34, a rear wheel 36, a front suspension unit and a rear suspension unit. In the illustrated embodiment, the front suspension unit is a front fork 38. Also, the rear suspension unit includes a rear arm 40 and a rear cushion 42. The rear cushion includes a shock absorber and a spring; also known as a "strut" or "coil over design". In some embodiments, the spring can be mounted separately from the shock absorber.

The body frame 32 generally is constructed with pipes, elongated members, or is cast in one or a plurality of pieces. The body frame 32 preferably comprises a main frame 46, a head pipe 48, a pair of seat rails 50, and other frame components.

The head pipe 48 is generally affixed to an end of the main frame 46. Generally, the end of the main frame 46 is a leading end of the motorcycle 30 when the motorcycle 30 proceeds. The main frame 46 preferably extends obliquely downwardly and rearwardly from the head pipe 48. The head pipe 48 preferably extends obliquely forwardly and downwardly from the foregoing end of the main frame 46. An axis of the head pipe 48 preferably extends on the longitudinal center plane LCP (FIG. 2) of the motorcycle 30. The longitudinal center plane LCP extends generally vertically and fore to aft along the center of the motorcycle 30.

As used throughout this description, the terms "forward" and "front" mean at or to the side where the head pipe 48 is positioned, and the terms "rear" and "rearward" mean at or to the opposite side of the front side, unless indicated otherwise or otherwise readily apparent from the context use. The arrow FORWARD of FIG. 1 indicates the forward or front side of the motorcycle 30.

Also, as used in this description, the term "horizontally" means that the subject portions, members or components extend generally parallel to the ground G when the motorcycle 30 stands normally on the ground. The term "vertically" means that portions, members or components extend generally normal to those that extend horizontally.

Further, as used throughout the description, the term "right hand side" means the side where the right hand of the rider of the motorcycle 30 is positioned, and the term "left hand side" means the side where the left hand of the rider is positioned. The arrows RIGHT and LEFT of FIG. 2 indicate the right hand side and the left hand side, respectively.

The seat rails 50 preferably extend generally rearwardly from a mid portion of the main frame 46. The seat rails 50 support a seat (not shown) for the rider. The seat can be disposed over the seat rails 50. The rider straddles the seat during operation.

With reference to FIG. 2, the illustrated front fork 38 comprises a pair of fork members 38R, 38L and a steering shaft 54. The steering shaft 54 preferably is positioned toward the rear of the fork members 38R, 38L and on the longitudinal center plane LCP of the motorcycle 30. Both the fork members 38R, 38L are positioned generally symmetrically relative to the longitudinal center plane LCP to generally interpose the steering shaft 54. In other words, the fork members 38R, 38L and the steering shaft 54 are arranged to make a triangle in the top plan view. Upper and lower fork brackets 56, 58 connect the fork members 38R, 38L and the steering shaft 54 with each other in the triangle formation.

The head pipe 48 (FIG. 1) journals the steering shaft 54 for pivotal movement via a bearing mechanism (not shown). The entire front fork 38 can pivot about a longitudinal axis of the steering shaft 54. The illustrated front fork 38 inclines forwardly and downwardly along the head pipe 48. The steering shaft 54 preferably carries a steering handle at a top thereof. The rider can steer the motorcycle 30 with the handle bar.

Each fork member 38R, 38L preferably comprises an upper cylinder 62R, 62L and a lower cylinder 64R, 64L coupled with each other to axially move relative to one another. Preferably, each upper cylinder 62R, 62L has an outer diameter that is slightly smaller than an inner diameter of the lower cylinder 64R, 64L and is fitted in the lower cylinder 64R, 64L. A seal member 65 preferably is inserted between each upper cylinder 62R, 62L and the associated lower cylinder 64R, 64L to seal therebetween. Preferably, the seal member 65 is positioned at a top end of each lower cylinder 64R, 64L. In the illustrated embodiment, both of the upper cylinders 62R, 62L are coupled with each other and also with the steering shaft 54 by the upper and lower fork brackets 56, 58.

The lower cylinders 64R, 64L interpose the front wheel 34 therebetween and journal the axle 66 of the front wheel 34.

Because each lower cylinder 64R, 64L is movable relative to the upper cylinder 62R, 62L, the front wheel 34 is allowed to move up and down relative to the body frame 32. This relative movement of the front wheel 34 can absorb shock caused by irregularities while traveling over a rough road or uneven ground. Each lower cylinder 64R, 64L preferably has a protector 68 that can protect the associated upper cylinder 62R, 62L from being damaged by pebbles or the like. As shown in FIGS. 4-7, the illustrated protector 68 is affixed to the top end of each lower cylinder 64R, 64L and extends upward to cover a lower portion of the respective upper cylinder 62R, 62L.

With reference to FIG. 1, the rear wheel 36 preferably is a propulsive wheel of the motorcycle 30. The motorcycle 30 can have a prime mover that powers the rear wheel 36. In the illustrated embodiment, the motorcycle 30 includes an internal combustion engine (not shown) as the prime mover. Preferably, the engine is affixed to the main frame 46 and to other frame components to be disposed below the main frame 46. The motive power of the engine is transmitted to the rear wheel 36 through a suitable transmission. In one variation, an electric motor can replace the engine. Additionally, in some embodiments, an engine can be used to power the front wheel 34 in addition or in lieu of the rear wheel 36.

The main frame 46 in the illustrated embodiment extends generally vertically from a mid portion thereof that is positioned under the seat rails 50 to form a rear bracket 72. The illustrated rear arm 40 generally forms a U shape in the top plan view and has a pair of arm members 74 that extend generally rearwardly. The arm members 74 preferably interpose the rear wheel 36 therebetween and journal the axle 76 of the rear wheel 36. A forward end of the rear arm 40 has a pivot shaft 78 that is journaled by a lower end portion of the rear bracket 72. The rear arm 40 thus is pivotable about an axis of the pivot shaft 78. Because of this construction, the rear wheel 36 is allowed to move up and down relative to the body frame 32.

With reference to FIGS. 1 and 3, the rear cushion 42 preferably comprises a cylinder 82, a piston 84, a piston rod 86 and an expansion coil spring 88. The cylinder 82 contains a working fluid in its inner space. The piston 84 is reciprocally movable within the cylinder 82 and divides the inner space of the cylinder to an upper fluid chamber 90 and a lower fluid chamber 92. The piston 84 preferably has a conventional damping mechanism such that the working fluid can move from one fluid chamber. For example, the fluid can move from the upper fluid chamber 90 to the other fluid chamber, i.e., the lower fluid chamber 92, and vice versa. The damping mechanism can have one or more small orifices and associated valves which inhibit the fluid from rapidly moving therethrough.

One end of the piston rod 86 preferably is affixed to the piston 84 and extends through the lower fluid chamber 92 generally downward and further extends outward beyond a bottom end of the cylinder 82. Another end of the piston rod 86 preferably is affixed to a mid portion of one of the arm members 74. On the other hand, a top end of the cylinder 82 which opposes the piston 84 preferably is affixed to a bottom portion of one of the seat rails 50.

One end of the coil spring 88 is retained by a retainer formed on an outer surface of the cylinder 82, while the other end of the coil spring 88 is retained by another retainer formed on the piston rod 86. Because the coil spring 88 fully expands unless any force is exerted thereto, a large part of the piston rod 86 extends out of the cylinder 82 when there is no load on the cushion 42.

As thus constructed, the rear arm 40 pivotally carries the rear wheel 36. The rear arm 40 allows the rear wheel 36 to move up and down relative to the body frame 32 as described above. The rear cushion 42 suspends the rear arm 40. Normally, the piston rod 86 and the piston 84 extend downward relative to the cylinder 82 because the coil spring 88 urges the piston rod 86 in this direction. When the motorcycle 30 travels over a rough road or uneven ground, the piston rod 86 with the piston 84 moves up and down relative to the cylinder 82 because the rear wheel 36 moves up and down due to the irregularities of the rough road or uneven ground. The reciprocal movements of the piston rod 86 can absorb the shock caused by the irregularities.

When the piston 84 moves within the cylinder 82, the working fluid goes to the lower fluid chamber 92 from the upper fluid chamber 90 and vice versa through the damping mechanism of the piston 84. The damping mechanism inhibits the working fluid from moving rapidly. That is, the rear cushion 42 dampens rapid up and down movement of the rear wheel 36. The rider, accordingly, is less uncomfortable when the rear wheel 36 is jolted during travel on the motorcycle 30.

Because of the construction described above, the motorcycle 30 is likely to squat and dive. For example, when squatting, the front forks 38R, 38L are likely to extend, possibly up to the point where the front wheel 34 leaves the ground while the rear cushion 42 compresses. On the other hand, when "diving", the front forks 38R, 38L compress while the rear cushion 42 extends, possibly to the point where the rear wheel 36 leaves the ground. Thus, the motorcycles can change their position, in a manner that can be uncomfortable to a rider during sudden acceleration or sudden deceleration.

With reference to FIGS. 1 and 3-7, the motorcycle 30 has a hydraulic system 100 that inhibits and/or reduces the diving and squatting movements of the motorcycle 30.

The hydraulic system 100 preferably comprises a front hydraulic device 102, a rear hydraulic device 104 and a hydraulic pressure adjusting device 106. The front hydraulic device 102 generates hydraulic pressure in response to the movement of the front wheel 34. The rear hydraulic device 104 generates hydraulic pressure in response to the movement of the rear wheel 36. The hydraulic pressure adjusting device 106 connects the front and rear hydraulic devices 102,104 with each other to adjust the hydraulic pressure of the rear hydraulic device 104 in response to the hydraulic pressure in the front hydraulic device 102 and vice versa.

In the illustrated embodiment, the front hydraulic device 102 is built in the fork member 38L that is located on the left hand side of the motorcycle 30, and the rear cushion 42 acts as the rear hydraulic device 104. Also, the hydraulic pressure adjusting device 106 is disposed below the seat rails 50 and in the rear of the rear cushion 42.

Figure 4:
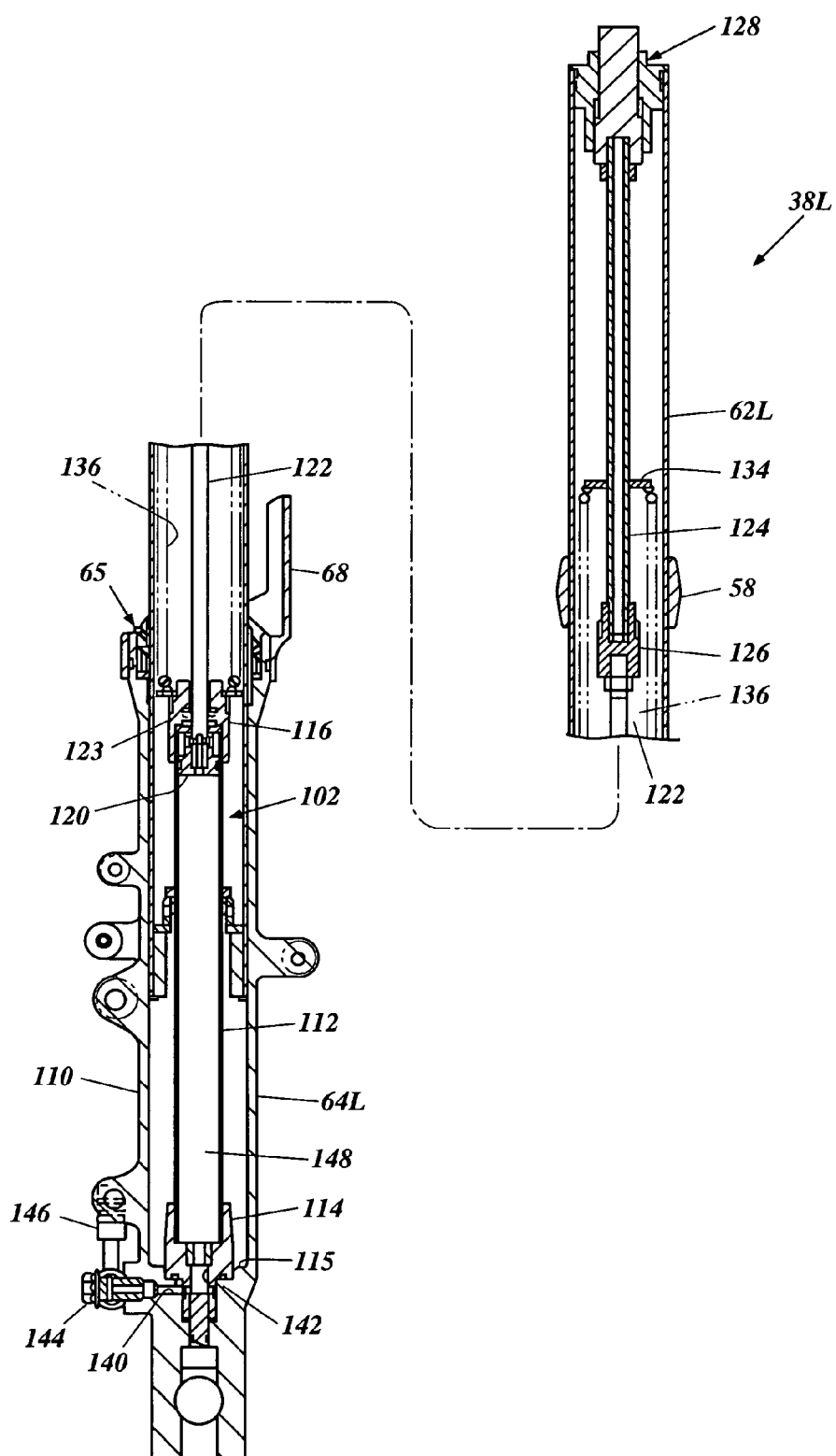
FIG. 4 is a cross-sectional view of a fork member of the front fork, wherein the fork member is located on the left hand side of the motorcycle (i.e., the fork member on the right hand side of FIG. 2)
Figure 5:
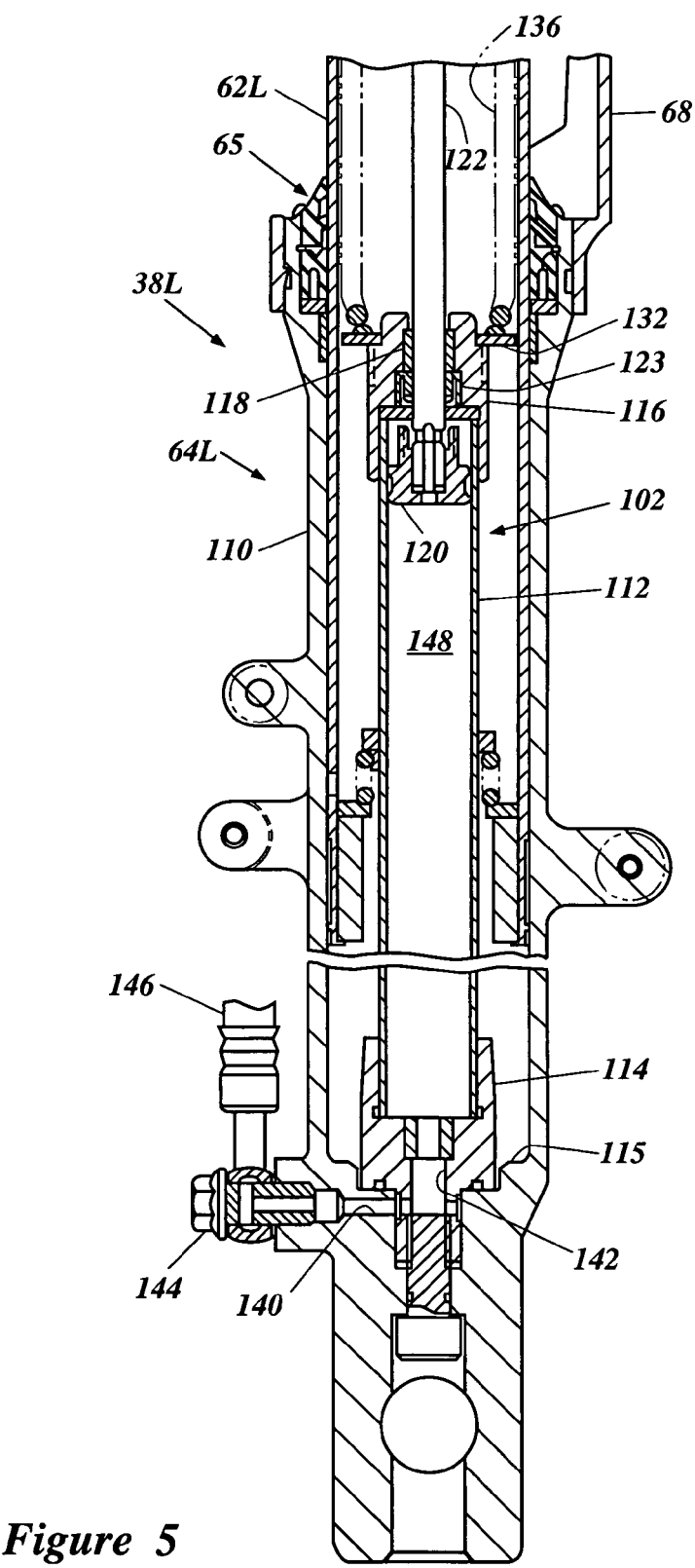
FIG. 5 is an enlarged cross-sectional view of a lower part of the fork member of FIG. 4.

With reference to FIGS. 3-5, the lower cylinder 64L preferably comprises an outer tube 110 and an inner tube 112. The inner tube 112 preferably is positioned coaxially with the outer tube 110. A fixing member 114 preferably fixes the bottom end of the inner tube 112 to an inner bottom portion 115 of the outer tube 110. A closure unit 116 preferably closes a top end of the inner tube 112. The closure unit 116 preferably has a bushing 118.

A piston 120 is reciprocally disposed within an internal space of the inner tube 112. A piston rod 122 is affixed to a top end of the piston 120 and extends upward beyond the closure unit 116. The bushing 118 preferably guides the piston rod 122. A seal member 123 preferably is inserted into the closure unit 116. The seal member 123 surrounds the piston rod 122 to isolate the internal space of the inner tube 112 from an outer space that encloses the inner tube 112 in the outer tube 110. A connecting pipe 124 preferably is coupled with a top end of the piston rod 122 by a coupler 126. The connecting pipe 124 further extends to a top end of the upper cylinder 62L. A closure member 128 closes the top end of the upper cylinder 62L. The connecting pipe 124 is affixed to a bottom of the closure member 128. That is, a top end of the piston rod 122 is affixed to the closure member 128 via the connecting pipe 124.

In one embodiment, a rod (i.e., a solid member) can replace the connecting pipe. In another embodiment, the piston rod 122 itself can extend to the closure member 128.

Preferably, a top end of the closure unit 116 has a retainer 132, while a mid portion of the connecting pipe 124 has another retainer 134. An expansion coil spring 136 preferably extends between the retainers 132, 134. The spring 136 urges the closure unit 116 downward relative to the piston rod 122. Because of the urging force of the spring 136, the outer tube 110 normally extends out of the upper cylinder 62L except for a certain area thereof as shown in FIGS. 4 and 5. Under the condition, the piston 120 is located in a top area of the internal space of the inner tube 112.

The inner bottom portion 115 of the outer tube 110 preferably defines an aperture 140 extending normal to a longitudinal center axis of the outer tube 110. The fixing member 114 preferably defines an aperture 142 extending along the longitudinal center axis of the outer tube 110. The aperture 142 communicates with the internal space of the inner tube 112 and also with the aperture 140 of the inner bottom portion 115 of the outer tube 110. In other words, the internal space of the inner tube 112 communicates with the aperture 140 of the outer tube 110 through the aperture 142. A plug 144 preferably is fitted into the aperture 140. The plug 144 has its own aperture therein. A hydraulic conduit or hose 146 is preferably connected to the plug 144 such that an internal passage of the hydraulic conduit 146 communicates with the aperture 140 through the aperture of the plug 144. As shown in FIG. 3, the hydraulic conduit 146 is connected to the hydraulic pressure adjusting device 106.

The working fluid preferably fills the internal space of the inner tube 112, the space between the inner tube 112 and the outer tube 110 and further a space within the upper cylinder 62L. Preferably, an inert gas fills an upper portion of the internal space of the inner tube 112. The inert gas preferably pressurizes the working fluid in the remainder space of the inner tube 112 to a pressure of about twelve atmospheres, although more or less pressure may also be used. The internal space of the inner tube 112 thus defines a compression chamber 148 that has its initial pressure of twelve atmospheres. Air having the atmospheric pressure preferably fills a top portion of the space of the upper cylinder 62L. Thus, the working fluid in the space between the inner tube 112 and the outer tube 110 keeps the atmospheric pressure. An inert gas can replace the air in one alternative.

With reference to FIG. 3, the hydraulic pressure adjusting device 106 preferably comprises a cylinder or housing 150, a small piston 152 and a large piston 154. The cylinder 150 preferably defines a small cylinder section 150a and a large cylinder section 150b. The small piston 152 has an outer diameter that is about equal to an inner diameter of the small cylinder section 150a and is reciprocally movable within a range of the small cylinder section 150a.

The large piston 154 has an outer diameter that is about equal to an inner diameter of the large cylinder section 150b and is reciprocally movable within a range of the large cylinder section 150b. A connecting member 156 connects the small and large pistons 152, 154 with each other such that both of the pistons 152, 154 move together. Thus, the small cylinder section 150a and the small piston 152 define a first chamber 158. The small cylinder section 150a, the large cylinder section 150b, the small piston 152 and the large piston 154 define a second chamber 160. The connecting member 156 is located within the second chamber 160. The large cylinder section 150b and the large piston 154 define a third chamber 162.

The hydraulic conduit 146 preferably is connected to a portion of the small cylinder section 150a out of the movable range of the small piston 152. Thus, the compression chamber 148 of the fork member 38L communicates with the first chamber 158 of the hydraulic pressure adjusting device 106. On the other hand, the upper fluid chamber 90 of the rear cushion 42 (i.e., the rear hydraulic device 104) is preferably connected to a portion of the large cylinder section 150b through a hydraulic conduit or hose 164. Thus, the upper fluid chamber 90 of the rear cushion 42 communicates with the second chamber 160 of the hydraulic pressure adjusting device 106.

The working fluid fills the first and second chambers 158, 160. In the illustrated embodiment, another volume of the inert gas fills the third chamber 162 to urge the large piston 154. In the illustrated embodiment, the inert gas also has the same pressure (i.e., the pressure of twelve atmospheres) as the inert gas in the compression chamber 148. The third chamber 162 thus is another compression chamber.

With reference to FIGS. 1 and 3, when the rider abruptly starts or accelerates the motorcycle 30, the motorcycle 30 tends to squat. The piston rod 86 of the rear cushion 42 thus is urged to retract into the cylinder 82 to push the piston 84 upward. The working fluid in the upper fluid chamber 90 is pushed away toward the hydraulic conduit 164 because the hydraulic pressure in the upper fluid chamber 90 increases. Some of the working fluid moves toward the second chamber 160 of the hydraulic pressure adjusting device 106 through the hydraulic conduit 164. The working fluid, or at least the pressure conducted by the fluid, pushes the large piston 154 against the urging force of the inert gas in the third chamber 162.

In accordance with the movement of the large piston 154, the small piston 152 moves to increase the volume of the first chamber 158. The working fluid in the compression chamber 148 of the front fork 38 thus is pulled toward the first chamber 158 through the hydraulic conduit 146. Accordingly, the pressure of the compression chamber 148 becomes lower than the initial pressure. That is, the compression chamber 148 of the front hydraulic device 102 generates a hydraulic pressure in response to the hydraulic pressure of the rear hydraulic device 104 (i.e., the pressure of the upper fluid chamber 90). The piston 120 moves downward within the inner tube 112. Because the piston rod 122 is affixed to the upper cylinder 62L through the connecting pipe 124 and the closure member 128, the upper cylinder 62L is pulled down toward the ground. Also, because the other fork member 38R is coupled with the fork member 38L, the upper cylinder 62R of the fork member 38R follows the upper cylinder 62L. As a result, the front wheel 34 is less likely to rise off the ground or bounce upwardly, thus urging the motorcycle toward a more horizontal driving orientation.

Alternatively, when the rider abruptly stops or decelerates the motorcycle 30, the motorcycle 30 tends to dive. The lower cylinder 64L of the fork member 38L thus is urged to move upward. The piston 120 moves downward to compress the fluid in the compression chamber 148. The working fluid in the compression chamber 148 is pushed toward the hydraulic conduit 146 because the hydraulic pressure in the compression chamber 148 increases. The working fluid thus moves toward the first chamber 158 of the hydraulic pressure adjusting device 106 through the hydraulic conduit 146. The working fluid pushes the small piston 152 and the large piston 154, which is connected with the small piston 152, toward the third chamber 162 against the urging force of the inert gas in the third chamber 162. The small and large pistons 152, 154 thus move together toward the third chamber 162.

In accordance with the movement of the small piston 152 and the large piston 154, the volume of the second chamber 160 increases. The working fluid in the upper fluid chamber 90 of the rear cushion 42 thus is pulled toward the second chamber 160 through the hydraulic conduit 164. Accordingly, the pressure in the upper fluid chamber 90 is reduced. That is, the rear hydraulic device 104 generates the hydraulic pressure in response to the hydraulic pressure of the front hydraulic device 102 (i.e., the pressure of the compression chamber 148). The piston 84 together with the piston rod 86 moves within the cylinder 82. The movement of the piston 84 and the piston rod 86 in the cylinder 82 pulls the cylinder 82 downward toward the ground. As a result, the rear wheel 36 is less likely to bounce up and urges the motorcycle 30 toward a more horizontal driving orientation.

In the illustrated embodiment, the front hydraulic device 102 is built in the fork member 38L. The front hydraulic device 102 thus does not lose any space around itself. As a result, the hydraulic system 100 does not make the layout of other components around the front fork 38 any more difficult. Also, the front hydraulic device 102 is less likely to be damaged should the motorcycle 30 fall down. The front hydraulic device 102 that is concealed within the fork member 38L preserves the external appearance of the motorcycle 30. In addition, no bracket is necessary to set the front hydraulic device out of the front fork 38. The production cost of the motorcycle 30 can be reduced, accordingly.

Also, in the illustrated embodiment, the inner bottom portion 115 of the lower cylinder 64L has the outlet aperture 140. This arrangement does not require any hydraulic conduit or hose to be disposed around the handle bar. The layout around the handle bar thus can be quite simple.

However, in another embodiment, the compression chamber 148 can be connected to the hydraulic pressure adjusting device 106 from an upper portion of the upper cylinder 62L. That is, for example, if the piston rod 122 is a pipe member and its internal space communicates with the internal space of the connecting pipe 124, the compression chamber 148 can be connected to the hydraulic pressure adjusting device 106 though the internal spaces of the modified piston rod and the pipe member. A reversed construction of the fork member 38L can also be used. That is, the upper cylinder 62L and the lower cylinder 64L can be positioned up side down with each other to place the end of the connecting pipe at the bottom of the fork member. In this alternative, the connecting pipe can be omitted and the piston rod can be elongated to the bottom of the fork member.

Figure 6:
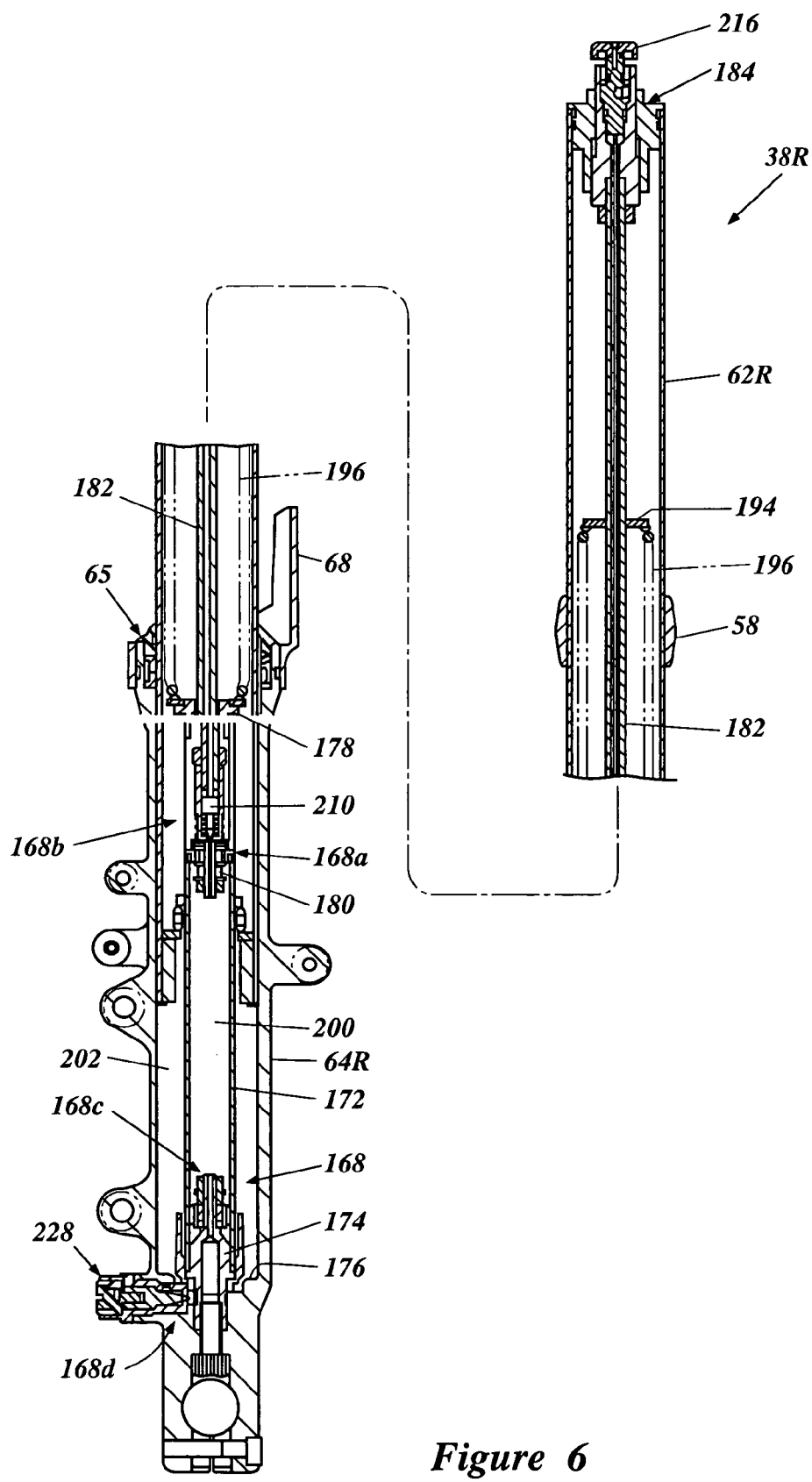
FIG. 6 is a cross-sectional view of another fork member of the front fork, wherein the fork member is located on the right hand side of the motorcycle (i.e., the fork member on the left hand side of FIG. 2)
Figure 7:
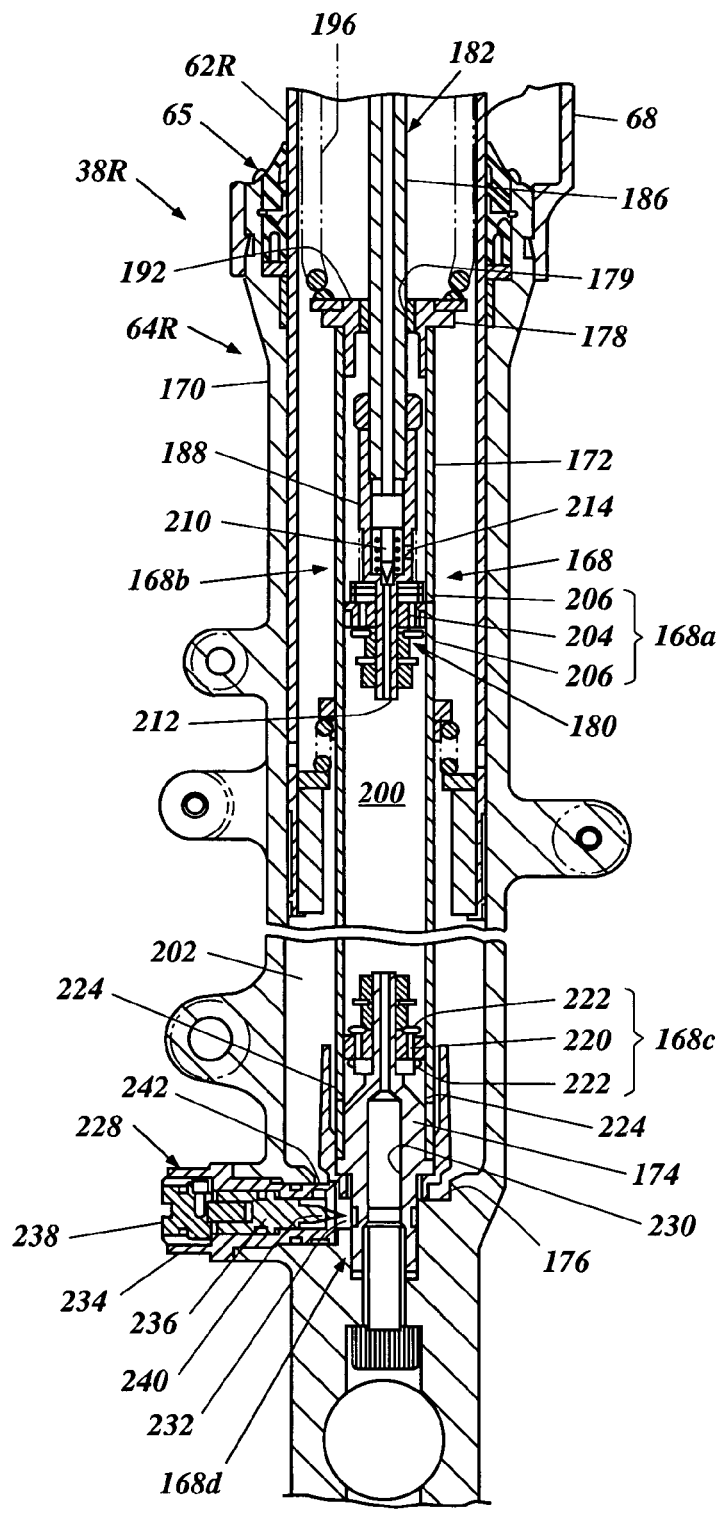
FIG. 7 is an enlarged cross-sectional view of a lower part of the fork member of FIG. 6.

With reference to FIGS. 1, 6 and 7, in the illustrated embodiment, a damping mechanism 168 of the front fork 38 is built in the fork member 38R located on the right hand side of the motorcycle 30. The fork member 38L described above and located on the left hand side of the motorcycle 30 does not have such a damping mechanism. The illustrated damping mechanism 168 preferably comprises a first damping unit 168a, a second damping unit 168b, a third damping unit 168c and a fourth damping unit 168d.

The lower cylinder 64R preferably comprises an outer tube 170 and an inner tube 172. The inner tube 172 is preferably positioned coaxially with the outer tube 170. A fixing member 174 extends generally upward from an inner bottom portion 176 of the outer tube 170. The fixing member 174 fixes the bottom end of the inner tube 172 to the inner bottom portion 176. A cap member 178 generally closes a top end of the inner tube 172. Preferably, the cap member 178 defines an aperture generally extending along the longitudinal axis of the inner tube 172. A bushing 179 is inserted into the aperture.

A piston 180 is reciprocally disposed within an internal space of the inner tube 172. A piston rod 182 is affixed to a top end of the piston 180 and extends upward through the aperture of the cap member 178. The bushing 179 guides the piston rod 182. An inner diameter of the bushing 179 preferably is larger than an outer diameter of the piston rod 182 to keep communications between both spaces that interposes the cap member 178. The piston rod 182 further extends to a top end of the upper cylinder 62R. A closure member 184 closes the top end of the upper cylinder 62R. The piston rod 182 is affixed to the closure member 184.

The illustrated piston rod 182 preferably is a pipe member 186 that is affixed to the piston 180 by a hollow member 188. Preferably, the hollow member 188 extends through the piston 180 and its bottom end is exposed at the other side of the piston 180.

Preferably, the cap member 178 defines a retainer surface 192, while a mid portion of the piston rod 182 has a retainer 194. An expansion coil spring 196 preferably extends between the retainer surface 192 and the retainer 194. The spring 196 urges the cap member 178 downward relative to the piston rod 182. Because of the urging force of the spring 196, the outer tube 170 normally extends out of the upper cylinder 62R except for a certain area thereof as shown in FIGS. 6 and 7. The piston 180 is located in a relatively top area of the internal space of the inner tube 112.

The piston 180 defines a main chamber 200 beneath the piston 180 itself together with the inner tube 172 and the fixing member 174. The remainder space within the inner tube 172, a space between the inner tube 172 and the outer tube 170 of the lower cylinder 64R and further a space in the upper cylinder 62R together define a sub chamber 202. A working fluid preferably fills the main chamber 200 and the sub chamber 202. Preferably, air having the atmospheric pressure fills a top portion of the space of the upper cylinder 62R. The main chamber 200 and the sub chamber 202 communicate with each other through the damping mechanism 168 as is described shortly. Thus, the working fluid in the main chamber 200 and the sub chamber 202 normally keeps the atmospheric pressure. An inert gas can replace the air in one embodiment.

In the illustrated embodiment, the first damping unit 168a is constructed on the piston 180 and comprises relatively small orifices 204 and valve plates 206. The orifices 204 penetrate the piston 180 such that the main chamber 200 communicates with a portion of the sub chamber 202 above the piston 180. The valve plates 206 are affixed to the piston 180 to be associated with the respective orifices 204. Each valve plate 206 is preferably positioned to almost inhibit the working fluid from flowing into or going out from the associated orifice 204.

The second damping unit 168b preferably is formed with a valve member 210, aperture 212, 214 defined by the bottom portion of the hollow member 188 and an adjusting member 216. The aperture 212 generally vertically extends through the bottom portion of the hollow member 188. The aperture 214 generally transversely extends through a mid portion of the hollow member 188: The main chamber 200 communicates with the portion of the sub chamber 202 above the piston .180 through the apertures 212, 214. The valve member 210 is preferably a rod having a bottom end that is tapered downward and can be inserted into a top end of the aperture 212. The valve member 210 preferably extends through the hollow member 188 and the pipe member 186 and is axially movable therein. The adjusting member 216 is coupled with a top end of the valve member 210. When the adjusting member 216 is operated, the valve member 210 axially moves within the pipe member 186 and the hollow member 188. The tapered bottom end of the valve member 210 thus enlarges or narrows an inner diameter of the aperture 212. The flow resistance of the aperture 212 can be adjusted, accordingly.

The third damping unit 168c preferably has a similar construction to the first damping unit 168a. The illustrated third damping unit 168c is constructed on the fixing member 174 and comprises relatively small orifices 220 and valve plates 222. The orifices 220 penetrate a top portion of the fixing member 174. A portion of the internal space of the inner tube 172 beneath the top portion of the fixing ember 174 communicates with the sub chamber 202 through apertures 224 that are defined in the inner tube 172. Thus, the main chamber 200 communicates with the sub chamber 202 through the orifices 220 and the apertures 224. The valve plates 222 are affixed to the fixing member 174 to be associated with the respective orifices 220. Each valve plate 222 is preferably positioned to almost inhibit the working fluid from flowing into or going out from the associated orifice 220.

The fourth damping unit 168d is preferably formed with a valve unit 228, an aperture 230 defined by the fixing member 174, and a recess 232 defined by the inner bottom portion 176 of the outer tube 170. The major part of the aperture 230 extends generally vertically through the fixing member 174 and the rest part thereof contiguously and generally transversely extends through the fixing member 174 to communicate with the recess 232.

The valve unit 228 preferably comprises a housing 234, a valve member 236 and an adjusting screw 238. The housing 234 preferably transversely extends through the outer tube 170. The illustrated housing 234 has an aperture 240 through which an internal space of the housing communicates with the recess 232 and another aperture 242 through which the internal space communicates with the sub chamber 202. Thus, the main chamber 200 and the sub chamber 202 communicate with each other through the aperture 230, the recess 232, the aperture 240 and the aperture 242.

The valve member 236 is axially movably disposed within the internal space of the housing 234. The valve member 236 preferably has an end that at is tapered toward the recess 232. The adjusting screw 238 is coupled with another end of the valve member 236. Thus, the valve member 236 axially moves through the housing 234 when the adjusting screw 238 is operated. The tapered end of the valve member 236 thus enlarges or narrows an inner diameter of the aperture 240. The flow resistance of the aperture 240 can be adjusted, accordingly.

As thus constructed, the lower cylinder 64R normally extends out of the upper cylinder 62R because the coil spring 196 urges the lower cylinder 64R downward relative to the upper cylinder 62R. When the motorcycle 30 travels over rough road or uneven ground, the main chamber 200 develops a relatively high pressure when the front wheel 34 meets a projection on the road because lower cylinder 64R moves toward the upper cylinder 62R. The fluid in the main chamber 200 thus moves to the sub chamber 202 through the first, second, third and fourth damping units 168a, 168b, 168c, 168d. A rapid flow of the fluid, however, is inhibited by the structures of the respective damping units 168a, 168b, 168c, 168d.

After the front wheel 34 clears the projection, the main chamber 200 is decompressed because the lower cylinder 64R is urged to move downward relative to the upper cylinder 62R by the coil spring 196. The fluid in the sub chamber 202 thus moves back to the main chamber 200 through the first, second, third and fourth damping units 168a, 168b, 168c, 168d. The fluid also is inhibited from rapidly flowing in the respective damping units 168a, 168b, 168c, 168d.

The reciprocal movements of the lower cylinder 64L can absorb the shock caused by the irregularities of the road or ground. Also, the damping mechanism 168 keeps the movements in a suitable speed. In addition, the other fork member 38L is coupled with the fork member 38R by the fork brackets 56, 58 as described above. The entire front fork 38 thus moves in unison. The front fork 38 damps rapid up and down movement of the front wheel 34. Thus, the rider is more comfortable during travel on the motorcycle 30.

In one embodiment, the damping mechanism can comprise a single damping unit such as, for example, one of the damping units 168a, 168b, 168c, 168d. In another alternative, one of the adjustable damping units 168b, 168d can be omitted. In a further alternative, no adjustable damping unit is required if a simpler structure of the damping mechanism is necessary.

In the illustrated embodiment, the fork member 38L that incorporates the front hydraulic device 102 does not incorporate any damping mechanism. This is advantageous because the structure of the front fork 38 can be quite simple. Also, because having no damping mechanism, the hydraulic pressure in the compression chamber 148 can be easily transferred to the hydraulic pressure adjusting device 106 without hampered by much resistance of the working fluid. The hydraulic system 100 thus can have sufficient responsiveness. In addition, the front hydraulic device 102 can be easily activated without any complicated setting work.

Both of the fork members 38R, 38L can be placed up side down. Also, each upper cylinder can have an inner diameter larger than an outer diameter of the lower cylinder such that the lower cylinder fits in the upper cylinder.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described, other modifications, which are within the scope of these inventions, will be readily apparent to those of skill in the art based upon this disclosure. It is also contemplated that various combinations or sub-combinations of the specific features and aspects of the embodiments or variations may be made and still fall within the scope of the inventions. It should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above.

What is claimed is:

1. A wheeled vehicle comprising a body frame, front and rear wheels, a front suspension unit coupled with the body frame to suspend the front wheel, the front suspension unit allowing the front wheel to move relative to the body frame, the front suspension unit having a pair of front suspension members coupled with each other, a rear suspension unit coupled with the body frame to suspend the rear wheel, the rear suspension unit allowing the rear wheel to move relative to the body frame, and a hydraulic system configured to inhibit change of a position of the body frame relative to the ground, the hydraulic system comprising a first hydraulic device configured to generate hydraulic pressure in response to the movement of the front wheel relative to the body frame, the first hydraulic device being built in one of the front suspension members, a second hydraulic device configured to generate hydraulic pressure in response to the movement of the rear wheel relative to the body frame, and a hydraulic pressure adjusting device arranged to connect the first and second hydraulic devices with each other, the hydraulic pressure adjusting device adjusting the hydraulic pressure of the second hydraulic device in response to the hydraulic pressure of the first hydraulic device, wherein a lower portion of said one of the front suspension members has an outlet through which the first hydraulic device communicates with the hydraulic pressure adjusting device.

2. The wheeled vehicle as set forth in claim 1, wherein said one of the front suspension members comprises an upper cylinder and a lower cylinder, the lower cylinder carries the front wheel, the upper and lower cylinders are coupled with each other to axially move relative to one another, the first hydraulic device generates the hydraulic pressure when the upper and lower cylinders move relative to one another, the lower cylinder defines the first hydraulic device.

3. A wheeled vehicle comprising a body frame, front and rear wheels, a front suspension unit coupled with the body frame to suspend the front wheel, the front suspension unit allowing the front wheel to move relative to the body frame, the front suspension unit having a pair of front suspension members coupled with each other, a rear suspension unit coupled with the body frame to suspend the rear wheel, the rear suspension unit allowing the rear wheel to move relative to the body frame, and a hydraulic system configured to inhibit change of a position of the body frame relative to the ground. the hydraulic system comprising a first hydraulic device configured to generate hydraulic pressure in response to the movement of the front wheel relative to the body frame, the first hydraulic device being built in one of the front suspension members, a second hydraulic device configured to generate hydraulic pressure in response to the movement of the rear wheel relative to the body frame, and a hydraulic pressure adjusting device arranged to connect the first and second hydraulic devices with each other, the hydraulic pressure adjusting device adjusting the hydraulic pressure of the second hydraulic device in response to the hydraulic pressure of the first hydraulic device, wherein said one of the front suspension members comprises a first cylinder and a second cylinder, the first or second cylinder carries the front wheel, the first and second cylinders are coupled with each other to axially move relative to one another, the first hydraulic device generates the hydraulic pressure when the upper and lower cylinders move relative to one another.

4. The wheeled vehicle as set forth in claim 3, wherein the rear suspension unit follows a movement of the front suspension unit when the hydraulic pressure adjusting device adjusts the hydraulic pressure of the second hydraulic device in response to the hydraulic pressure of the first hydraulic device.

5. The wheeled vehicle as set forth in claim 4, wherein the front suspension unit follows a movement of the rear suspension unit when the hydraulic pressure adjusting device adjusts the hydraulic pressure of the first hydraulic device in response to the hydraulic pressure of the second hydraulic device.

6. The wheeled vehicle as set forth in claim 3 additionally comprising a biasing member arranged to urge the first or second cylinder to extend relative to each other, the first hydraulic device comprising a piston reciprocally movable in the first or second cylinder, a piston rod extending from the piston and having an end connected to the remainder of the first and second cylinders, the first or second cylinder defining a hydraulic pressure chamber, the hydraulic pressure chamber generating the hydraulic pressure therein when the piston moves within the first or second cylinder, and the hydraulic chamber being connected to the hydraulic pressure adjusting device.

7. The wheeled vehicle as set forth in claim 6, wherein the first or second cylinder comprises an outer tube and an inner tube, the piston moves within the inner tube, and the hydraulic pressure chamber is defined in the inner tube.

8. The wheeled vehicle as set forth in claim 3, wherein the second hydraulic device comprises a cylinder and a piston reciprocally movable in the cylinder, the cylinder and the piston together define a hydraulic pressure chamber, the hydraulic pressure chamber generates the hydraulic pressure therein when the piston moves within the cylinder, and the hydraulic chamber communicates with the hydraulic pressure adjusting device.

9. The wheeled vehicle as set forth in claim 3, wherein the hydraulic pressure adjusting device comprises a cylinder, the cylinder defines a small cylinder section and a large cylinder section, a first piston reciprocally movable in a first range of the small cylinder section, a second piston reciprocally movable in a second range of the large cylinder section, the first and second pistons are connected with each other, the small cylinder section is connected to the first hydraulic device at a location out of the first range, and the large diameter portion is connected to the second hydraulic pressure device at a location in the second range.

10. The wheeled vehicle as set forth in claim 9, wherein the first and second pistons are connected by a connecting member, a portion of the large cylinder section that does not have the connecting member contains a biasing component to urge the second piston toward the small cylinder section.

11. The wheeled vehicle as set forth in claim 10, wherein the biasing component is an inert gas.

12. A wheeled vehicle comprising a body frame, front and rear wheels, a front suspension unit coupled with the body frame to suspend the front wheel, the front suspension unit allowing the front wheel to move relative to the body frame, the front suspension unit having a pair of front suspension members coupled with each other, a rear suspension unit coupled with the body frame to suspend the rear wheel, the rear suspension unit allowing the rear wheel to move relative to the body frame, and a hydraulic system configured to inhibit change of a position of the body frame relative to the ground the hydraulic system comprising a first hydraulic device configured to generate hydraulic pressure in response to the movement of the front wheel relative to the body frame, the first hydraulic device being built in one of the front suspension members, a second hydraulic device configured to generate hydraulic pressure in response to the movement of the rear wheel relative to the body frame, and a hydraulic pressure adjusting device arranged to connect the first and second hydraulic devices with each other, the hydraulic pressure adjusting device adjusting the hydraulic pressure of the second hydraulic device in response to the hydraulic pressure of the first hydraulic device, wherein the remainder of the front suspension members comprises a first cylinder and a second cylinder, the first or second cylinder carries the front wheel, the first and second cylinders are coupled with each other to axially move relative to one another, and a damping mechanism configured to damp the relative movement of the first and second cylinders.

13. The wheeled vehicle as set forth in claim 12, wherein the damping mechanism comprises a valve configured to regulate flow of a working fluid in said remainder of the front suspension members.

14. A wheeled vehicle comprising a body frame, front and rear wheels, a front suspension unit coupled with the body frame to suspend the front wheel, the front suspension unit allowing the front wheel to move relative to the body frame, the front suspension unit having a pair of front suspension members coupled with each other, a rear suspension unit coupled with the body frame to suspend the rear wheel, the rear suspension unit allowing the rear wheel to move relative to the body frame, and a hydraulic system configured to inhibit change of a position of the body frame relative to the ground, the hydraulic system comprising a first hydraulic device configured to generate hydraulic pressure in response to the movement of the front wheel relative to the body frame, the first hydraulic device being built in one of the front suspension members, a second hydraulic device configured to generate hydraulic pressure in response to the movement of the rear wheel relative to the body frame, and a hydraulic pressure adjusting device arranged to connect the first and second hydraulic devices with each other, the hydraulic pressure adjusting device adjusting the hydraulic pressure of the second hydraulic device in response to the hydraulic pressure of the first hydraulic device, wherein each one of the front suspension members comprises a first cylinder and a second cylinder, the first or second cylinder carries the front wheel, the first and second cylinders are coupled with each other to axially move relative to one another, the front suspension unit has a damping mechanism configured to damp the relative movement of the first and second cylinders, said one of the front suspension members does not have the damping mechanism, and the remainder of the front suspension members has the damping mechanism.

15. The wheeled vehicle as set forth in claim 14, wherein the rear suspension unit follows a movement of the front suspension unit when the hydraulic pressure adjusting device adjusts the hydraulic pressure of the second hydraulic device in response to the hydraulic pressure of the first hydraulic device.

16. The wheeled vehicle as set forth in claim 14, wherein the hydraulic pressure adjusting device comprises a cylinder, the cylinder defines a small cylinder section and a large cylinder section, a first piston reciprocally movable in a first range of the small cylinder section, a second piston reciprocally movable in a second range of the large cylinder section, the first and second pistons are connected with each other, the small cylinder section is connected to the first hydraulic device at a location out of the first range, and the large diameter portion is connected to the second hydraulic pressure device at a location in the second range.

17. A wheeled vehicle comprising a body frame, front and rear wheels, a front suspension unit coupled with the body frame to suspend the front wheel, the front suspension unit allowing the front wheel to move relative to the body frame, the front suspension unit having a pair of front suspension members coupled with each other, a rear suspension unit coupled with the body frame to suspend the rear wheel, the rear suspension unit allowing the rear wheel to move relative to the body frame, and a hydraulic system configured to inhibit change of a position of the body frame relative to the ground the hydraulic system comprising a first hydraulic device configured to generate hydraulic pressure in response to the movement of the front wheel relative to the body frame, the first hydraulic device being built in one of the front suspension members, a second hydraulic device configured to generate hydraulic pressure in response to the movement of the rear wheel relative to the body frame, and a hydraulic pressure adjusting device arranged to connect the first and second hydraulic devices with each other, the hydraulic pressure adjusting device adjusting the hydraulic pressure of the second hydraulic device in response to the hydraulic pressure of the first hydraulic device, wherein the rear suspension unit comprises a first suspension member arranged to pivotally carry the rear wheel, and a second suspension member arranged to suspend the first suspension member, the second hydraulic device is built in the second suspension member.

18. The wheeled vehicle as set forth in claim 17, wherein the rear suspension unit follows a movement of the front suspension unit when the hydraulic pressure adjusting device adjusts the hydraulic pressure of the second hydraulic device in response to the hydraulic pressure of the first hydraulic device.

19. The wheeled vehicle as set forth in claim 17 wherein the second hydraulic device comprises a cylinder and a piston reciprocally movable in the cylinder, the cylinder and the piston together define a hydraulic pressure chamber, the hydraulic pressure chamber generates the hydraulic pressure therein when the piston moves within the cylinder, and the hydraulic chamber communicates with the hydraulic pressure adjusting device.

20. The wheeled vehicle as set forth in claim 17, wherein the hydraulic pressure adjusting device comprises a cylinder, the cylinder defines a small cylinder section and a large cylinder section, a first piston reciprocally movable in a first range of the small cylinder section, a second piston reciprocally movable in a second range of the large cylinder section, the first and second pistons are connected with each other, the small cylinder section is connected to the first hydraulic device at a location out of the first range, and the large diameter portion is connected to the second hydraulic pressure device at a location in the second range.

* * * * *

UNITED STATES PATENT AND TRADEMARK OFFICE
CERTIFICATE OF CORRECTION

PATENT NO. : 7,281,722 B2 Page 1 of 1
APPLICATION NO. : 11/064402
DATED : October 16, 2007
INVENTOR(S) : Hiromi Fukuda et al.

It is certified that error appears in the above-identified patent and that said Letters Patent is hereby corrected as shown below:

At column 11, line 4, Before "180" delete ".".

At column 13, line 46, In claim 3, after "ground" delete "." and insert -- , --, therefor.

At column 14, line 62, In claim 12, after "ground" insert -- , --.

At column 16, line 16, In claim 17, after "ground" insert -- , --.

Signed and Sealed this

Eighth Day of July, 2008

JON W. DUDAS
*Director of the United States Patent and Trademark Office*